(No Model.)

H. E. KELLEY
ANIMAL TRAP.

No. 419,453. Patented Jan. 14, 1890.

WITNESSES:
C. L. Bindixon
J. J. Laass

INVENTOR:
Harry E. Kelley
BY
Duell, Laass & Duell
ATTORNEYS

UNITED STATES PATENT OFFICE.

HARRY E. KELLEY, OF NIAGARA FALLS, ASSIGNOR TO THE ONEIDA COMMUNITY, (LIMITED,) OF KENWOOD, NEW YORK.

ANIMAL-TRAP.

SPECIFICATION forming part of Letters Patent No. 419,453, dated January 14, 1890.

Application filed November 6, 1889. Serial No. 329,430. (No model.)

*To all whom it may concern:*

Be it known that I, HARRY E. KELLEY, of Niagara Falls, in the county of Niagara, in the State of New York, have invented new and useful Improvements in Animal-Traps, of which the following, taken in connection with the accompanying drawings, is a full, clear, and exact description.

This invention relates to the construction of the entrapping-jaws of animal-traps, and is a specific improvement of the jaws described and shown in my prior patent of September 17, 1889, No. 411,246. In my said prior invention the jaws were formed of sheet metal, as in my present case; but they were crimped transversely in such a manner as to cause them to present to each other broad gripping-faces. While jaws of said form are particularly well adapted for holding some species of animals, yet they are not reliable in seizing and retaining all kinds of animals entrapped thereby.

My present invention consists in forming a trap-jaw from a blank of sheet metal, the end portions of which I crimp gradually transversely, so as to cause them to present one or both edges thereof toward the companion jaw and leave the extremities flat or straight for attachment to the posts of the trap. The aforesaid crimp I continue throughout the central or main portion of the blank, and thus cause the same to likewise present one or both edges toward the companion jaw, all as hereinafter more fully described, and specifically set forth in the claim.

Figure 1:
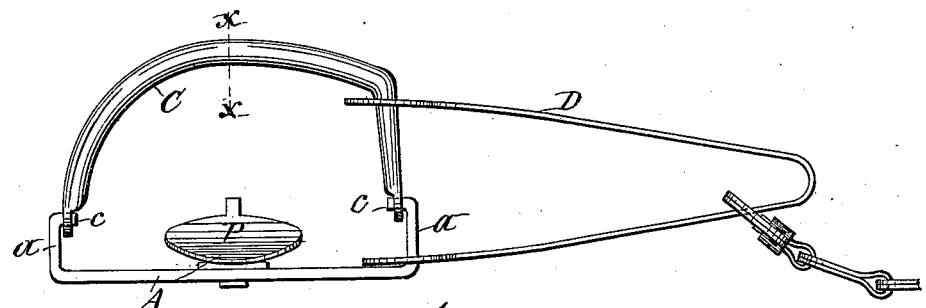
Figure 2:
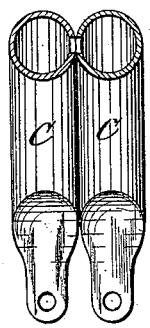

In the annexed drawings, Figure 1 is a side view of an animal-trap embodying my improvement. Fig. 2 is a transverse section of the two jaws on line $x\,x$, Fig. 1; and Figs. 3, 4, 5, 6, and 7 are transverse sections of modifications of my invention.

Similar letters of reference indicate corresponding parts.

A represents the base of the trap, from opposite ends of which base rise the posts $a\,a$, to which the jaws C C are hinged.

D denotes the spring which actuates the jaws, and P is the bait-pan over which the jaws close when the trap is sprung, as represented in Fig. 1 of the drawings.

The jaw C, I form of a blank stamped out of sheet-steel and of a length to allow it to be bent into the requisite bow shape. The ends thereof may be either perforated for the reception of pins $c\,c$, by which to hinge them to the posts $a\,a$, or may be hinged to said posts in any other suitable and well-known manner.

In forming said jaw I first subject the blank to the blow or pressure of suitable dies, by means of which the end portions of the blank become crimped transversely gradually, so as to bring one or both edges thereof in such a position as to be opposed to the companion jaw when the trap is sprung, the extremities of the blank being maintained flat or straight transversely, as hereinbefore stated. The aforesaid crimp is continued throughout the main or central portion of the jaw, and thus the latter also has one or both edges facing the companion jaw. The shape of the crimping may be varied to a great extent without departing from the nature of my invention.

Figure 3:
Figure 4:
Figure 5:
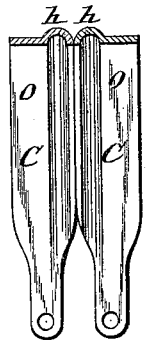
Figure 6:
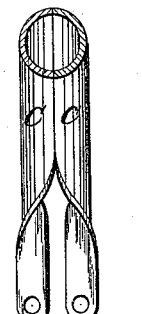
Figure 7:
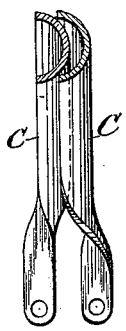

The annexed drawings show six forms of jaws embodying my invention. Fig. 2 shows jaws formed by bending the blanks transversely into tubular shape, with a space between the edges of each jaw and with said edges at the gripping sides of the jaws. Figs. 3 and 4 show jaws crimped transversely each into the shape in cross-section of the two oblique sides and short side of a trapezoid and disposed with the outer edge of one of the oblique sides opposite to that of the companion jaw. Fig. 5 shows jaws formed of blanks, each crimped only at the portion adjacent to the companion jaw, the crimping being semicircular or segmental in cross-section, as shown at $h$, the remainder $o$ being maintained straight. Fig. 6 shows two jaws, each of which is formed by bending the blank transversely into semi-cylindrical shape and disposed with its edges facing those of the opposed jaw, and thus presenting two sets of gripping-edges; and Fig. 7 shows the jaws formed in the same manner as last described, but disposed with the convex side of one facing the concave side of the other jaw, and thus only one of said jaws presents thin gripping-edges. Either of the described forms of trap-jaws are amply stiffened by the transverse crimping, and are caused to present gripping-edges which are adapted to securely hold the entrapped animal.

Having described my invention, what I claim as new, and desire to secure by Letters Patent, is—

In an animal-trap, the entrapping-jaw formed of a blank of sheet metal having its end portion crimped gradually transversely, so as to bring one or both edges thereof facing the companion jaw and terminating with transversely-straight extremities, and the crimp continued in the same manner throughout the central or main portion of the blank, substantially as described and shown.

In testimony whereof I have hereunto signed my name this 30th day of September, 1889.

HARRY E. KELLEY. [L. S.]

Witnesses:
E. J. MacKENNA,
G. N. MILLER.